Sept. 3, 1957　　　　　G. E. COMSTOCK 3D　　　　　2,804,735

MACHINE TOOL CARRIAGE RECIPROCATING MECHANISM

Filed Nov. 28, 1955

INVENTOR
GEORGE E. COMSTOCK 3rd.
BY
ATTORNEY

United States Patent Office 2,804,735
Patented Sept. 3, 1957

2,804,735

MACHINE TOOL CARRIAGE RECIPROCATING MECHANISM

George E. Comstock 3d, Princeton, Mass., assignor to Norton Company, Worcester, Mass., a corporation of Massachusetts Application November 28, 1955, Serial No. 549,397

4 Claims. (Cl. 51—233)

The invention relates to machine tool carriage reciprocating mechanisms.

One object of the invention is to provide reciprocating mechanism which will enable machine tool carriages to be driven at far higher speeds than are now customary, such as speeds up to double or even quadruple present speeds without at the same time setting up, by the reacting forces at reversals, such vibration in the base of the machine tool as will impair its ability to generate geometrically true surfaces. Another object of the invention is to provide such a mechanism which is simple and will not easily become deranged. Another object is to provide a mechanism of the type indicated which requires little or no maintenance.

Other objects will be in part obvious or in part pointed out hereinafter.

In the accompanying drawings schematically illustrating one of many possible embodiments of the invention, Figure 1 is a front elevation of a machine tool mechanism of the invention with the front wall of the machine broken away in many places the better to illustrate the mechanism, Figure 2 is a vertical sectional view taken on the line 2—2 of Figure 1, Figure 3 is a vertical sectional view showing a modification of part of the mechanism, Figure 4 is a view mostly in vertical section showing a modification of another part of the mechanism, Figure 5 is a detailed view showing a portion of the relief valve in section.

Referring now to Figure 2, the base 10 of the machine tool, which in many cases will be a grinding machine, has ways 11 and 12 supporting a carriage 13 having complementary surfaces 15 and 16 nicely fitting the ways 11 and 12 thus to mount the carriage 13 for reciprocation. Referring now to Figure 1, as well as Figure 2, secured to the under side of the carriage 13 are brackets 17 and 18 connected to piston rods 21 and 22 connected to pistons 23 and 24 in an internal cylinder 25 formed in the upper part 26 of a large mass 30 which may conveniently be a piece of cast iron. Referring to Figure 2, the large mass 30 has way surfaces 31 and 32 resting on ways 33 and 34 formed on the upper surface of a horizontal web 35 also well shown in Figure 1. The mass 30 is thereby also mounted for reciprocation and in a direction parallel to the reciprocation of the carriage 13.

As shown in the left hand side of Figure 1, there is a long slot 37 through the web 35 through which downwardly extends a bracket 39 which is secured to the under side of the mass 30 and it is connected to a piston rod 40 connected to a piston 41 in a cylinder 42.

Referring to both figures, extending through a bore in the mass 30 is a long rod 45 the ends of which extend into the end walls of the base 10 and which shaft 45 is secured to the left hand end wall, for example as by means of a set screw 46. Referring to Figure 1, on the shaft 45 and extending between the left hand end wall of the base 10 and the mass 30 is a spring 47 while on the shaft 45 and extending between the right hand end wall of the base 10 and the mass 30 is a spring 48. To make room for long springs, the mass 30 can have counterbores 51 and 52 as shown. However, in some cases the springs 47 and 48 or other equivalent means may be between some stationary abutments and the mass 30, and may become active only when the mass 30 has moved some given distance. This is illustrated in Figure 3.

The carriage 13 is reciprocated by any desired hydraulic or pneumatic reciprocating mechanism of which so many are known in the art and have been described in patents and in the literature and are in daily use that I deem it unnecessary to describe any particular one herein. Reversals of direction of reciprocation are customarily made by means of carriage dogs 53 and 54 in a T-slot 55 striking an interposed reversing lever, not shown, which reversing lever actuates a valve to change the flow of hydraulic or pneumatic fluid. Illustratively I show pipes 57 and 58 connected to ports 59 and 60 admitting and exhausting fluid from the left hand and right hand ends respectively of the internal cylinder 25.

If high carriage speed is attempted in the usual grinding machine the shock of reversal vibrates the whole machine so that beyond some certain speed for each machine poor results will be achieved with respect to surface finish of the workpiece or the like. Yet for a long time higher carriage speeds have been wanted for such machines as cylindrical grinders and surface grinders. In accordance with this invention higher carriage speeds may be achieved without setting up detrimental vibrations because the large mass 30 connected as it is to the cylinder element of the piston and cylinder apparatus (or the arrangement might be reversed and the mass might be connected to the piston element with the cylinder element connected to the carriage) absorbs the momentum of reversal by itself moving but, according to the laws of physics, for a limited distance only. The reason for the springs 47 and 48 now becomes apparent in that they tend to center the large mass 30 to keep it from drifting too far from the median location shown. Figure 4 illustrates the reversal of the arrangement shown in Figure 1, in that in Figure 4, the upper part 26 of the cylinder 25 is connected to the carriage 13, and the piston rods 21 and 22 are connected by the brackets 17 and 18 to the large mass 30.

The piston 41 in the cylinder 42 acts as a dampener to the reaction induced reciprocations of the mass 30. I show a port 61 in the left hand side of the cylinder 42 and a port 62 in the right hand side of the cylinder 42. The port 61 is connected by piping 65 to a throttle valve 70 which is connected to a T-union 71 connected to the port 62 and to a relief valve 75 which in turn is connected to the main pump 77 which is connected to intake piping 78 extending into a sump 80 formed in the base 10. The relief valve 75 exhausts through piping 81 into the sump 80. This assumes that in the illustrative embodiment the fluid is hydraulic and in the usual case this will be oil and in most applications of the invention the machine will probably have hydraulic reciprocating and controlling mechanism. At least such is the preferred form of the invention to the best of my present knowledge. This same pump 77 can operate the pistons 23 and 24 and a pipe 82 is shown leading the fluid to the hydraulic controlling mechanism that is not shown. A return pipe 85 from such hydraulic operating mechanism is shown in Figure 1 which returns the fluid such as oil to the sump 80. As the dampener cylinder 42 should not be connected to exhaust fluid through the relief valve 75 in the best embodiments of this invention, the relief valve 75 contains, as shown in Figure 5, a check valve 76 associated with the port leading to the T-union 71 which check valve 76 allows fluid to go to the dampening cylinder from the pump 77 but not to exhaust from the dampening cylinder into the sump 80 through the relief valve 75.

By manipulating the valve 70 opening its wide or closing it a bit, the dampening effect can be varied at will. At the bottom right hand side of Figure 2 I show a valve wheel 90 to control the valve 70 by turning a valve shaft 91 which is connected to the movable valve element.

It will be seen that if the large mass 30 takes up an average position to the left of the median position, the spring 47 will exert force to return it to such median position and if on the other hand the large mass 30 assumes a position somewhat to the right of the median position, the spring 48 will exert a force to return it to such median position. Springs from their very nature exert more force the more they are compressed and therefore the greater the deflection the greater the force tending to cause the mass to reassume its median position. There is, however, plenty of room for deflections of the mass 30 to the left and to the right and of course more or less room for deflection can be provided as desired.

With the momentum of reversals of the carriage 13 absorbed by idle reciprocation of the large mass 30 much higher speeds can be given to the carriage 13 than heretofore practical without causing undue vibration. For obtaining large speeds in the first place it is sufficient to provide more powerful pumps and motors and larger pipes. The pump 77 is shown as driven by a motor 95 through a reduction gearing 96. The reason for connecting the circuit of the cylinder 42 to the pump 77 is simply to keep the dampening circuit including the cylinder 42 always full of oil to compensate for leaks and if a good tight system full of oil can be provided this feature can be eliminated.

In many cases the dampening means to dampen the resulting reciprocations of the large mass due to the reaction from reversal of the carriage embodied herein in the piston 41, cylinder 42 and pipe connections shown may be dispensed with. This will result, however, in greater amplitude of movement of the mass 30 so there is an advantage in using such dampening means. In some cases the springs 47 and 48 or equivalent means exerting opposed forces on the large mass which are increased when the mass is moved against them might be omitted relying on the proposition that as the reactions at reversal are equal in energy, the mass 30 will tend to reciprocate in a median position, providing instead some device for resetting it whenever it drifts out of position.

In this invention as both the main cylinder and the piston or pistons reciprocate whichever one is connected to the carriage 13, the pipes 57 and 58 are shown connected to flexible conduits such as rubber hoses, fragments of which are shown at 101 and 102.

It will thus be seen that there has been provided by this invention a machine tool carriage reciprocating mechanism in accordance with which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. Machine tool carriage and reciprocating mechanism comprising a machine tool carriage, supporting means supporting said carriage for rectilinear reciprocation, a large mass, supporting means supporting said large mass for rectilinear reciprocation parallel to the rectilinear reciprocation of said carriage, a piston and cylinder apparatus, one of said carriage and said large mass being connected to the piston of said piston and cylinder apparatus and the other of said carriage and said large mass being connected to the cylinder of said piston and cylinder apparatus whereby the reaction due to the reversal of the rectilinear motion of the carriage is absorbed by reciprocating said large mass.

2. Machine tool carriage and reciprocating mechanism according to claim 1 having means exerting opposed forces on said large mass which opposed forces are increased when the mass is moved against them respectively thereby to tend to return said large mass to a position where the two opposing forces are substantially equal.

3. Machine tool carriage and reciprocating mechanism according to claim 2 having dampening means to dampen the resultant reciprocations of said large mass due to the reaction from reversal of the carriage.

4. Machine tool carriage and reciprocating mechanism according to claim 1 having dampening means to dampen the resultant reciprocations of said large mass due to the reaction from reversal of the carriage.

No references cited.